United States Patent
Ohtsuka et al.

(10) Patent No.: US 6,577,491 B1
(45) Date of Patent: Jun. 10, 2003

(54) CAPACITOR ARRAY

(75) Inventors: Daisuke Ohtsuka, Shiga-ken (JP); Masaaki Taniguchi, Fukui-ken (JP); Yoshio Kawaguchi, Fukui (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/287,657

(22) Filed: Nov. 5, 2002

(30) Foreign Application Priority Data

Nov. 29, 2001 (JP) ...................................... 2001-365217

(51) Int. Cl.$^7$ ............................................... H01G 4/228
(52) U.S. Cl. ................. 361/306.3; 361/309; 361/306.1; 361/322; 29/25.42
(58) Field of Search .............................. 361/303, 306.1, 361/306.2, 306.3, 307, 308.1, 309, 311–313, 321.2; 29/25.41, 25.42

(56) References Cited

U.S. PATENT DOCUMENTS 6,072,690 A * 6/2000 Farooq et al. ............ 361/321.2
6,195,249 B1 * 2/2001 Honda et al. ............. 361/306.3

FOREIGN PATENT DOCUMENTS

JP          2000-252165          9/2000

* cited by examiner

Primary Examiner—Anthony Dinkins
(74) Attorney, Agent, or Firm—Keating & Bennett, LLP (57) ABSTRACT

A capacitor array includes four internal electrodes and internal electrode extraction sections which are in electrical conduction with the corresponding internal electrodes and have predetermined widths which are symmetrically arranged relative to a long-side-direction center of each dielectric sheet. Here, the internal electrode extraction sections are arranged so that a pitch between the internal electrode extraction sections is smaller than a pitch between the internal electrodes. In other words, the internal electrode extraction sections are arranged so that they are disposed towards the center in the direction in which they are disposed. A predetermined number of dielectric sheets formed in this way are stacked, and dielectric sheets not having electrodes are stacked above and below the stacked predetermined number of dielectric sheets. External electrodes which connect to the internal electrode extraction sections are disposed at side surfaces of a component defined by these stacked dielectric sheets in order to form a capacitor array including four capacitors on one component. The capacitor array has excellent drop shock resistance.

10 Claims, 9 Drawing Sheets

CAPACITOR ARRAY

BACKGROUND OF THE INVENTION

1. Field of the Invention

The present invention relates to a capacitor array including a plurality of capacitors disposed on a single component.

2. Description of the Related Art

In recent years, size reduction and integration of devices using electronic circuits, such as communication devices, have caused size reduction and integration of electronic components that are included in such devices. Size reduction and integration are achieved by, for example, arranging capacitors or other electronic components in arrays. Accordingly, there is an increasing demand for arranging such electronic components into arrays.

The structure of a related capacitor array is described with reference to FIGS. 7 to 10.

Figure 7:
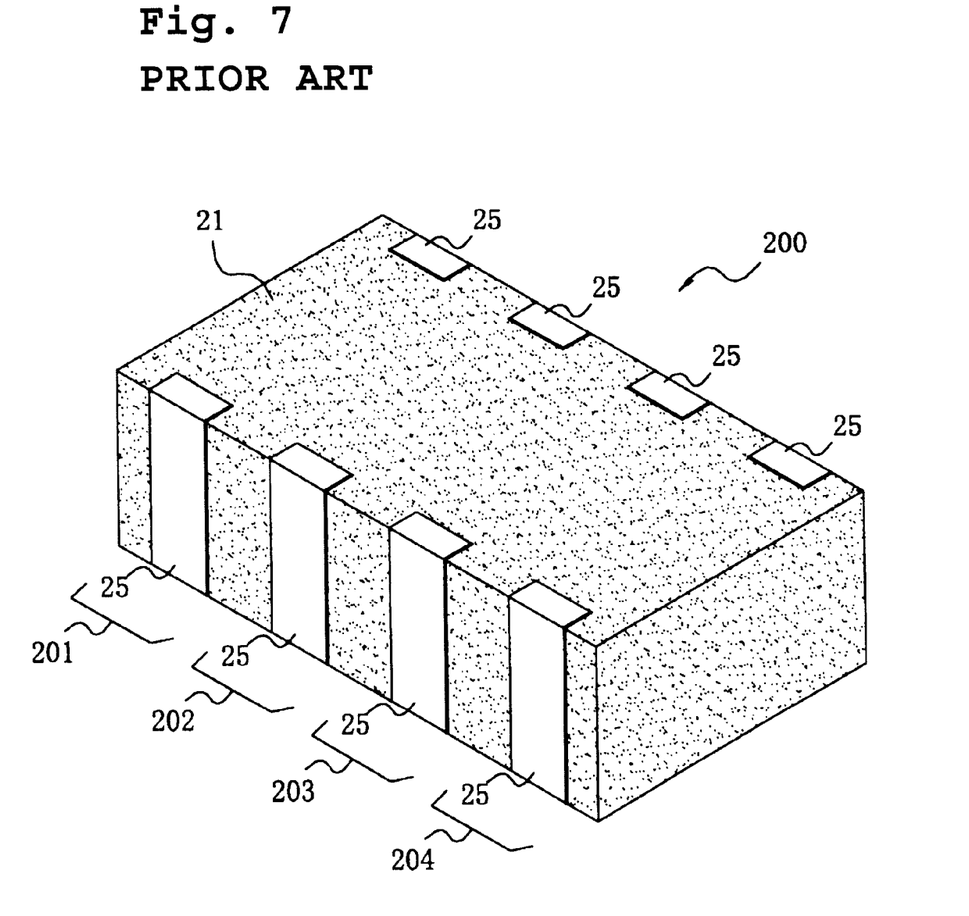
FIG. 7 is an external perspective view of a related capacitor array.
Figure 8:
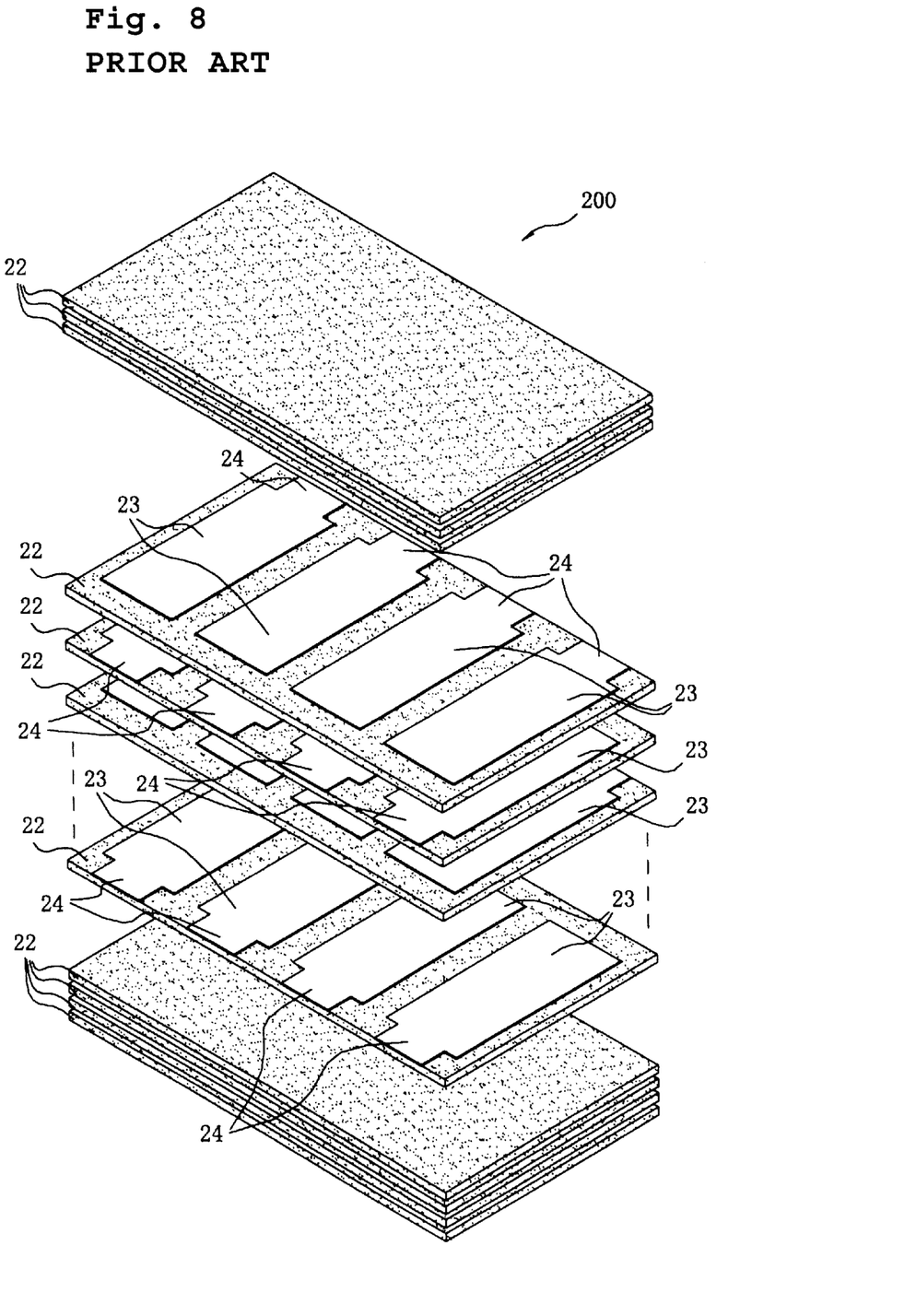
FIG. 8 is an exploded perspective view of the related capacitor array.

FIG. 7 is an external perspective view of a capacitor array, and FIG. 8 is an exploded perspective view of the capacitor array.

Figure 9:
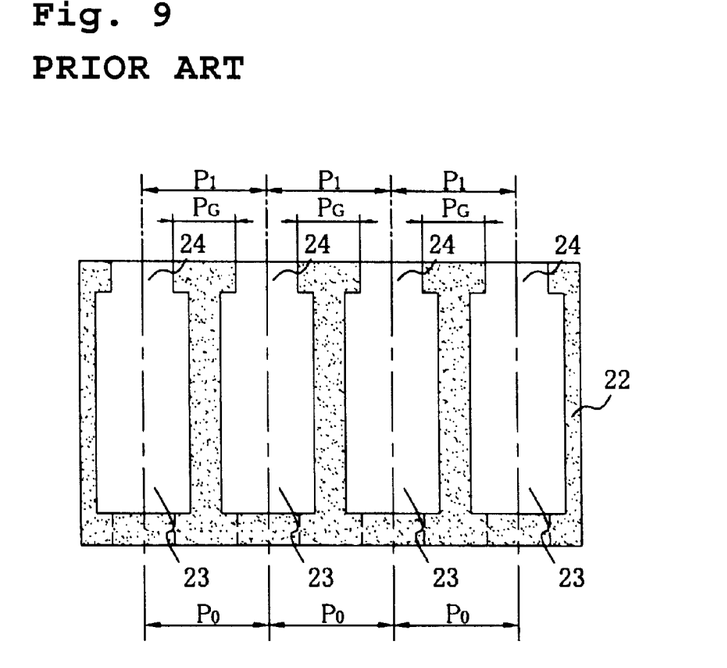
FIG. 9 is a plan sectional view of the related capacitor array.
Figure 10:
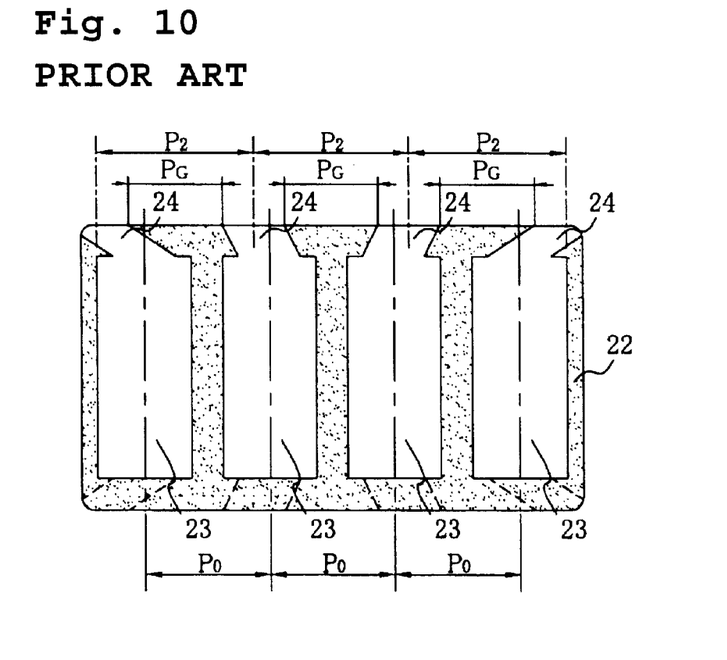
FIG. 10 is a plan sectional view of another related capacitor array having a different structure.

FIG. 9 is a plan sectional view of the capacitor array, and FIG. 10 is a plan sectional view of another capacitor array.

In FIGS. 7 to 10, reference numeral 200 denotes a multilayer capacitor array, and reference numerals 201 to 204 denote single capacitors. Reference numeral 21 denotes a component, reference numerals 22 denote dielectric sheets, reference numerals 23 denote internal electrodes, reference numerals 24 denote internal electrode extraction sections, and reference numerals 25 denote external electrodes.

As shown in FIG. 8, the component 21 is constructed by stacking a predetermined number of dielectric sheets 22 having internal electrodes 23 provided thereon and a predetermined number of dielectric sheets 22 not having internal electrodes 23 provided thereon. Four internal electrodes 23 are arranged on a surface of each of the dielectric sheets 22 having internal electrodes 23 disposed thereon. Similarly, four internal electrode extraction sections 24 are disposed on the surface of each of the dielectric sheets 22 having internal electrodes 23 provided thereon. The internal electrode extraction sections 24 are in electrical conduction with the respective internal electrodes 23 and extend to an end of the dielectric sheet 22 so that they can connect to an external device.

More specifically, the component 21 is constructed by stacking using the following method. A predetermined number of dielectric sheets 22 not having internal electrodes provided thereon are stacked. Then, a predetermined number of dielectric sheets 22 having internal electrodes 23 disposed thereon are successively stacked one after another upon the stacked dielectric sheets 22 not having internal electrodes provided thereon so that the internal electrode extraction sections 24 of adjacent upper and lower dielectric sheets 22 do not overlap. Thereafter, a predetermined number of dielectric sheets 22 not having internal electrodes provided thereon are stacked upon the stacked dielectric sheets 22 having internal electrodes 23 provided thereon. By sintering the stacked dielectric sheets 22, the component 21 is completed. Thereafter, external electrodes 25 which come into electrical conduction with the internal electrode extraction sections 24 disposed on the component 21.

By forming such a structure, as shown in FIG. 7, the capacitor array 200 includes individual capacitors 201 to 204 including the respective internal electrodes (not shown) and the respective external electrodes 25.

Here, as shown in FIG. 9, the four internal electrodes 23 provided on each of the dielectric sheets 22 are formed symmetrically with respect to straight lines passing through a longitudinal center of each of the dielectric sheets 22. The internal electrode extraction sections 24 are formed so that centerlines extending in the direction of extension of the internal electrode extraction sections 24 coincide with the center lines of the respective internal electrodes 23. Therefore, a pitch $P_0$ between adjacent internal electrodes 23 and a pitch $P_1$, between adjacent internal electrode extraction sections 24 are the same. Since the external electrodes 25 are formed on the outer surface of the component 21 in correspondence with the positions of the internal electrode extraction sections 24, the pitch $P_0$ between adjacent internal electrodes 23 and a pitch between adjacent external electrodes 25 are the same.

On the other hand, as shown in FIG. 10, there is a structure in which a pitch $P_2$ between adjacent portions of internal electrode extraction sections 24 that contact the outside surface of a component 21 is greater than a pitch $P_0$ between adjacent internal electrodes 23. This structure is the capacitor array structure disclosed in Japanese Unexamined Patent Application Publication No. 11-154621, and provides the advantage of preventing short-circuiting between terminals.

However, such related capacitor arrays have problems which need to be solved.

Figure 11A:
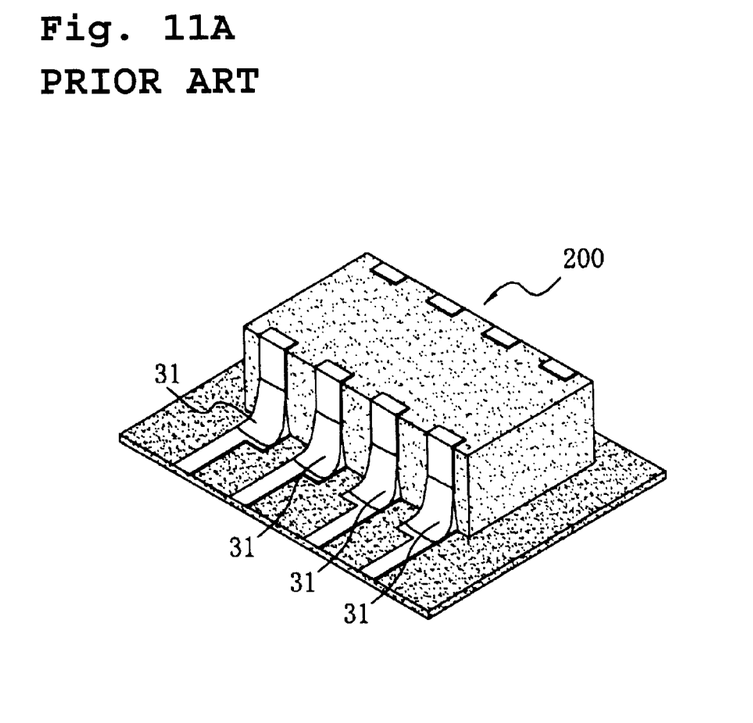
FIGS. 11A and 11B are external perspective views showing a state in which a related capacitor array is soldered and a state in which a single multilayer capacitor is soldered, respectively.
Figure 11B:
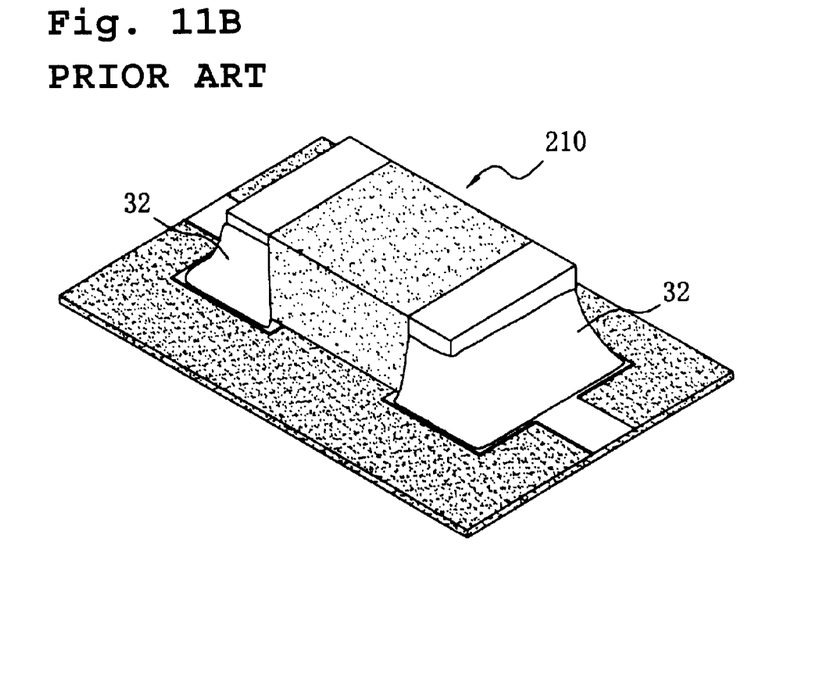

FIG. 11A is an external perspective view showing a state in which a related capacitor array is soldered, and FIG. 11B is an external perspective view showing a state in which a single multilayer capacitor is soldered. In FIG. 11A, reference numeral 200 denotes a capacitor array and reference numerals 31 denote solder fillets, and in FIG. 11B, reference numeral 210 denotes a single multilayer capacitor, and reference numerals 32 denote solder fillets.

As shown in FIG. 11B, the solder fillets 32 are arranged to extend from both external electrode end surfaces (the front right surface and the back left surface in FIG. 11B) to side surfaces of the single capacitor 210 in order to mount the single capacitor 210 onto a substrate. In other words, four sides of the single capacitor 210 are mounted to the substrate, and the amount of solder at one location is large. On the other hand, as shown in FIG. 11A, the capacitor array 200 is soldered to a substrate by external electrodes of the capacitors of the array, so that only a side of the body of the capacitor array 200 is soldered. Since the external configuration of the capacitor array is substantially the same as that of the single multilayer capacitor, each external electrode is small, so that the soldering area is small. Therefore, the amount of solder used is decreased. In addition, since the external electrodes are separated, the solder is not concentrated, so that soldering strength is decreased.

In the capacitor array shown in FIG. 10, since the pitch between adjacent external electrodes is large, a gap between adjacent external electrodes is large. Therefore, the distance between supporting points is increased, so that, when the substrate is flexed, stress exerted upon the capacitor array is increased. Consequently, the capacitor array becomes less resistant to a dropping shock produced by the flexing of the substrate.

Accordingly, for example, when a mobile communication device, such as a cellular phone, incorporating a.capacitor array, is dropped, so that an external force is exerted upon the capacitor array, the capacitor array may crack. This is thought to occur because, when an external force is exerted, the substrate to which the capacitor array is mounted is flexed, so that stress produced by the flexing causes the capacitor array to crack.

SUMMARY OF THE INVENTION

In order to overcome the problems described above, preferred embodiments of the present invention provide a small capacitor array which can provide sufficient soldering strength to avoid being separated even by ah external force exerted upon a communication device including the capacitor array.

According to a preferred embodiment of the present invention, a capacitor array has a pitch between external electrodes, provided on side surfaces of a substantially rectangular component, that is smaller than a pitch between internal electrodes which are in electrical conduction with the external electrodes.

In another preferred embodiment of the present invention, a gap between the external electrodes adjacent to each other is preferably equal to or greater than approximately 50 μm.

In a further preferred embodiment of the present invention, the external electrodes are arranged symmetrically relative to the center of a side surface of the component in a direction in which the internal electrodes are disposed in parallel.

Other features, characteristics, elements and advantages of the present invention will become more apparent from the following detailed description of preferred embodiments thereof with reference to the attached drawings.

DETAILED DESCRIPTION OF PREFERRED EMBODIMENTS:

A description of the structure of a capacitor array of a preferred embodiment of the present invention will be given with reference to FIGS. 1 to 6.

Figure 1:
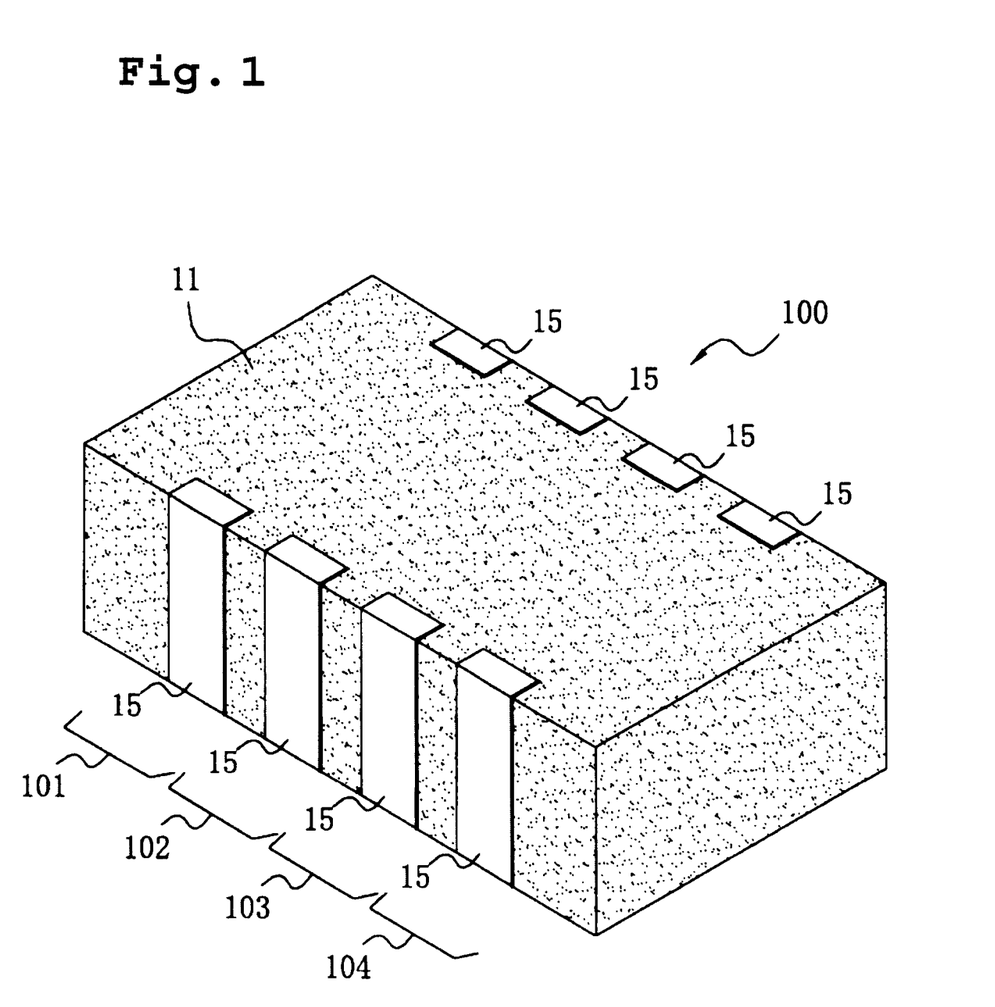
FIG. 1 is an external perspective view of a capacitor array of a preferred embodiment of the present invention.
Figure 2:
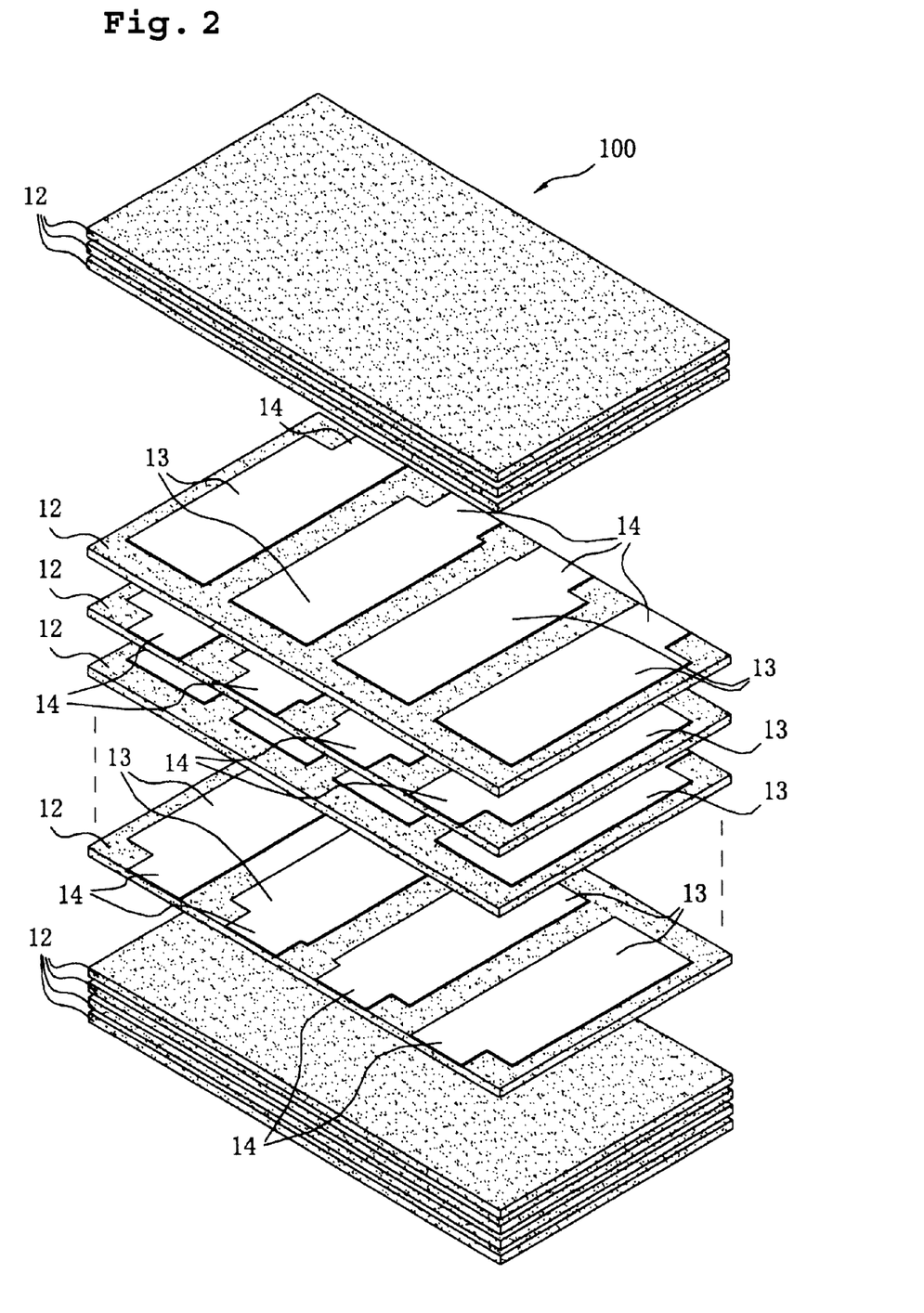
FIG. 2 is an exploded perspective view of the capacitor array of the preferred embodiment of the present invention.
Figure 3:
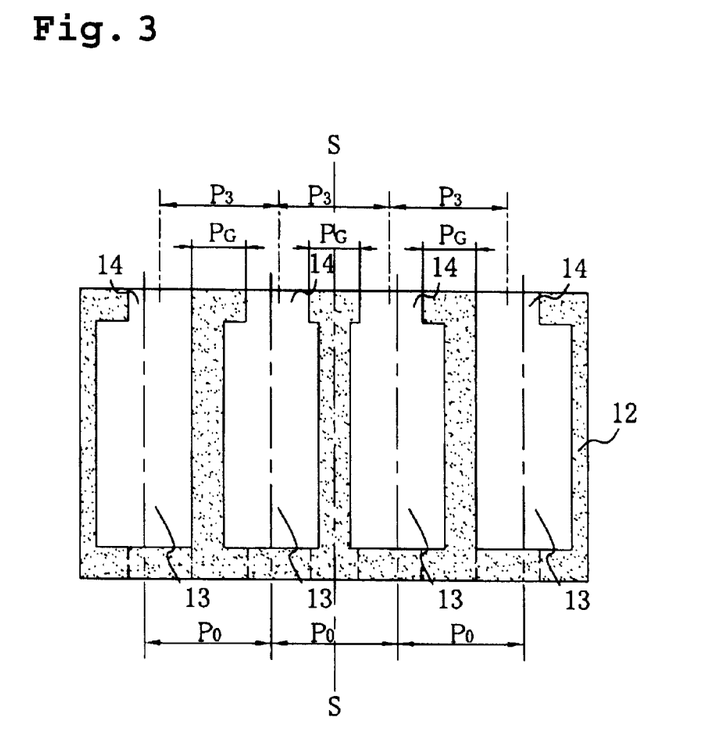
FIG. 3 is a plan sectional view of the capacitor array of the preferred embodiment of the present invention.
Figure 4:
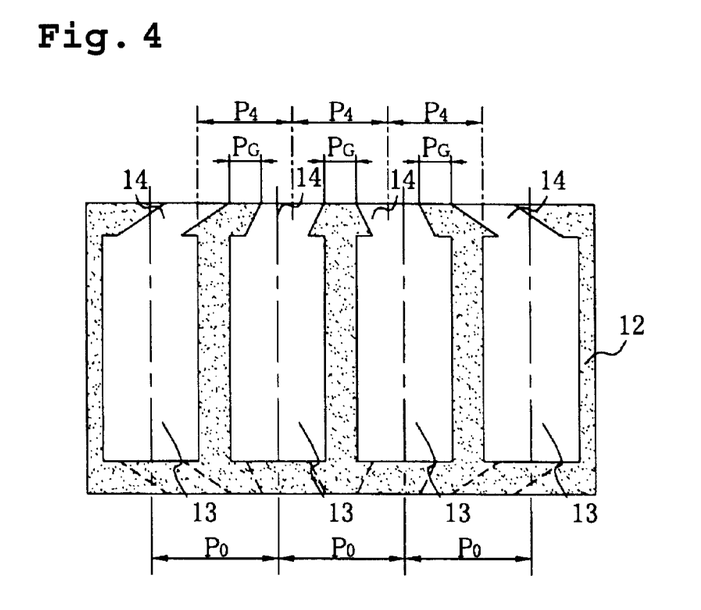
FIG. 4 is a plan sectional view of another capacitor array having a different structure.
Figure 5:
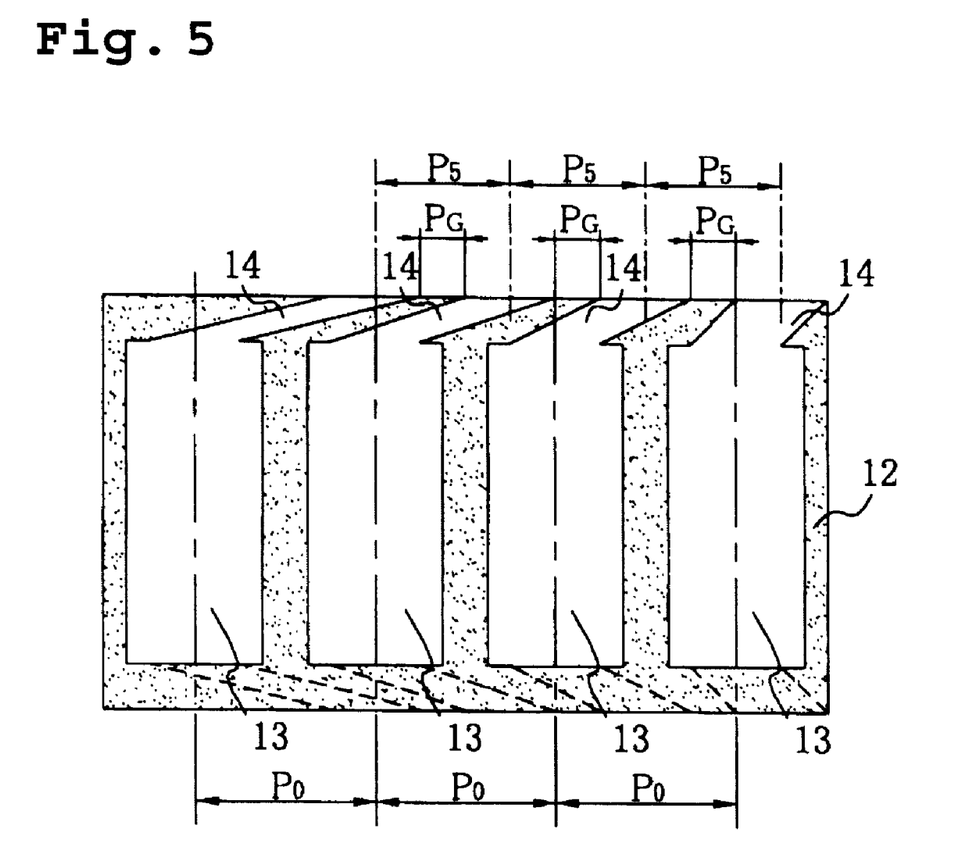
FIG. 5 is a plan sectional view of still another capacitor array having a different structure.
Figure 6:
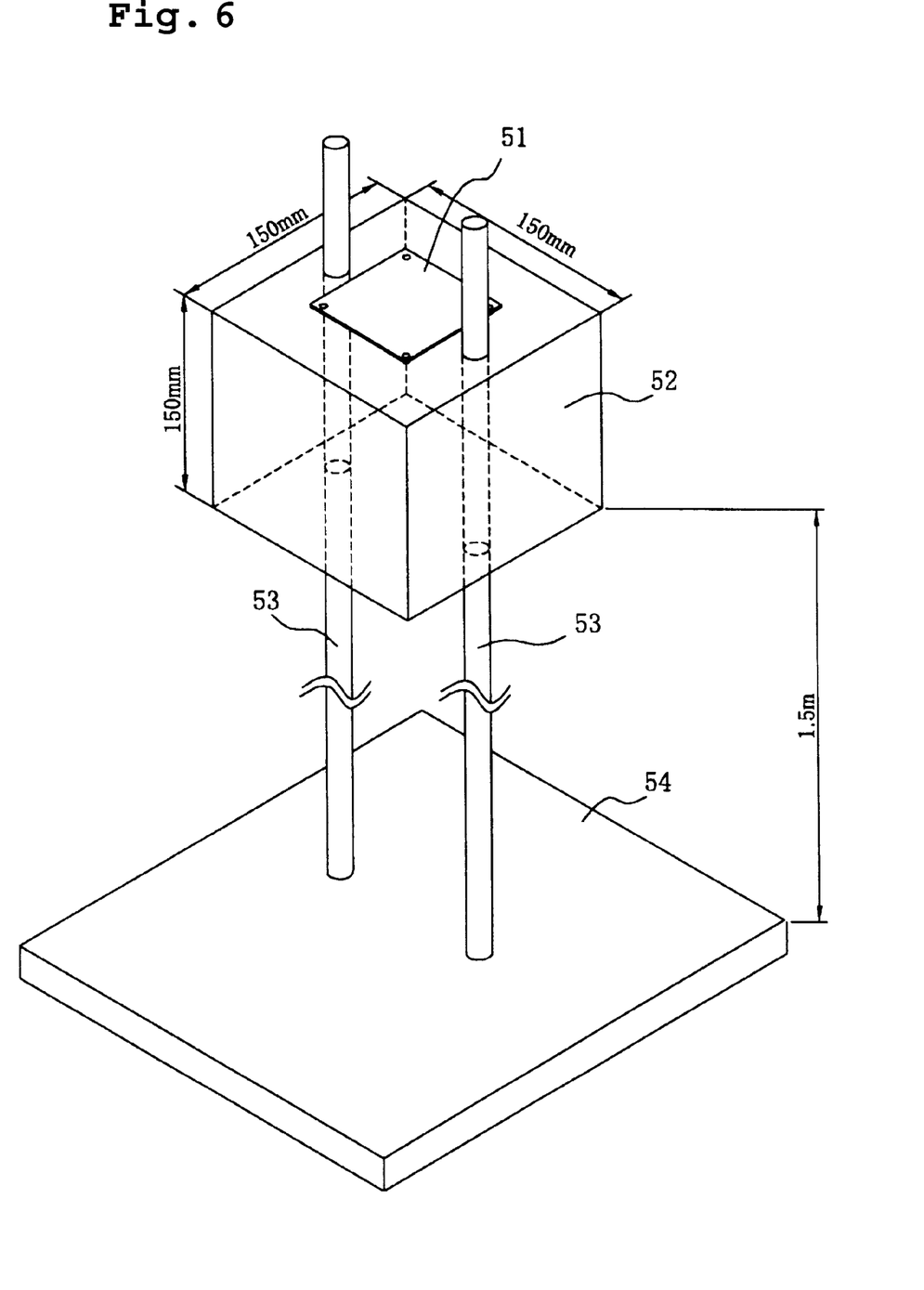
FIG. 6 is an external perspective view of a drop impact resistance test device.

FIG. 1 is an external perspective view of a capacitor array. FIG. 2 is an exploded perspective view of the capacitor array. FIG. 3 is a plan sectional view thereof. FIGS. 4 and 5 are plan sectional views of capacitor arrays including internal electrode extraction sections having other forms. FIG. 6 is an external perspective view of a drop test device.

In FIGS. 1 to 5, reference numeral 100 denotes a capacitor array, reference numerals 101 to 104 denote capacitors, reference numeral 11 denotes a component, reference numerals 12 denote dielectric sheets, reference numerals 13 denote internal electrodes, reference numerals 14 denote internal electrode extraction sections, and reference numerals 15 denote external electrodes.

$P_O$ denotes a pitch between adjacent internal electrodes 13; $P_3$, $P_4$, and $P_5$ denote pitches between adjacent external electrodes 15 which are in electrical conduction with their respective internal electrode extraction sections 14; and $P_G$ denotes a gap between adjacent external electrodes 15.

In FIG. 6, reference numeral 51 denotes a sample substrate to which the capacitor array is mounted, reference numeral 52 denotes a drop jig, reference numerals 53 denote direction supporting rods, and reference numeral 54 denotes a concrete base.

As shown in FIG. 2, the component 11 shown in FIG. 1 is preferably formed by stacking a predetermined number of dielectric sheets 12 having internal electrodes 13 formed thereon and a predetermined number of dielectric sheets 12 not having internal electrodes formed thereon. Four internal electrodes 13 are arranged and formed on a surface of each of the dielectric sheets 12 having internal electrodes 13 formed thereon similarly, four internal electrode extraction sections 14 are formed on the surface of each of the dielectric sheets 12 having internal electrodes 13 formed thereon. The internal electrode extraction sections 14 are in electrical conduction with the respective internal electrodes 13 and extend to an end of the dielectric sheet 12 so that they can connect to an external device.

More specifically, the component 11 is formed by stacking using the following method. A predetermined number of dielectric sheets 12 not having internal electrodes formed thereon are stacked. Then, a predetermined number of dielectric sheets 12 having internal electrodes 13 formed thereon are successively stacked one after another upon the stacked dielectric sheets 12 not having internal electrodes formed thereon so that the internal electrode extraction sections 14 of stacked adjacent upper and lower dielectric sheets 12 do not overlap. Thereafter, a predetermined number of dielectric sheets 12 not having internal electrodes formed thereon are stacked upon the stacked dielectric sheets 12 having internal electrodes 13 formed thereon. By sintering the stacked dielectric sheets 12, the component 11 is formed. Thereafter, external electrodes 15 which come into electrical conduction with the internal electrode extraction sections 14 are formed on the component 11.

By forming such a structure, as shown in FIG. 1, the capacitor array 100 includes individual capacitors 101 to 104 having the respective internal electrodes (not shown) and the respective external electrodes 15.

As shown in FIG. 3, four internal electrodes 13 and the respective internal electrode extraction sections 14, which are in electrical conduction with the electrodes 13, are arranged so as to have predetermined widths with a long-side-direction-center line S—S of each dielectric sheet 12 which defines a symmetrical axis. Here, the internal electrode extraction sections 14 are arranged so that the pitch $P_3$ between the internal electrode extraction sections 14 is smaller than the pitch $P_O$ between the internal electrodes 13. In other words, the internal electrode extraction sections 14 are arranged so that they are disposed towards the center in the direction in which they are disposed by displacing the central axes of the internal. electrode extraction sections 14 from the central axes of the respective internal electrodes 13.

The internal electrode extraction sections 14 may each have another structure shown in FIG. 4. As shown in FIG. 4, each internal electrode extraction section 14 is formed with a predetermined width from an end of its corresponding internal electrode 13 to an end of the dielectric sheet 12, obliquely from the central line of its corresponding internal electrode 13. Here, the pitch $P_4$ between the internal electrode extraction sections 14 is smaller than the pitch $P_0$ between the internal electrodes 13.

As shown in FIG. 5, the internal electrode extraction sections 14 may be located towards an end of the dielectric sheet 12 in the direction in which they are disposed, instead of being located towards the center of the dielectric sheet 12 in the direction in which they are disposed. Even in this case, the pitch $P_5$ between the internal electrode extraction sections 14 is smaller than the pitch $P_0$ between the internal electrodes 13.

Shock resistance and solderability tests were performed on these capacitor arrays and the related capacitor arrays. The results are shown below.

The tests were performed on the capacitor arrays having the structures shown in FIGS. 3, 4, and 5, and the related capacitor arrays having the structures shown in FIGS. 9 and 10.

Here, common structures of these capacitor arrays and the method of producing them are as follows.

$BaTiO_3$ dielectric sheets having a thickness of about 3 $\mu$m were used. 180 dielectric sheets having internal electrodes and internal electrode extraction sections formed thereon were stacked, and, then, 65 dielectric sheets without electrodes were stacked above and below the stacked 180 dielectric sheets. These dielectric sheets were pressed to form a block. The block was cut into a predetermined form in order to form a raw chip of a component of a capacitor array having four capacitors. By baking this raw chip at about 1300° C., the component was formed. Thereafter, an electrically conductive paste formed of, for example, copper, was applied to a side surface of the component so as to be connected to the internal electrode extraction sections, and, then, baking was performed in an $N_2$ atmosphere at a temperature of about 850° C. After the baking, plating was performed using nickel (Ni) and tin (Sn) in order to form external electrodes. In this way, a capacitor array having external dimensions of approximately 3.2 mm×1.6 mm×1.15 mm and including four 1 $\mu$F capacitors was formed.

Here, the widths of the internal electrode extraction sections and the external electrodes were about 400 $\mu$m, and the pitch $P_0$ between adjacent internal electrodes was about 800 $\mu$m.

The drop shock resistance and solderability tests were performed on such capacitor arrays with the pitches $P_1$ to $P_5$ between the internal electrode extraction sections and between the external electrodes, and the gap $P_G$ between adjacent internal electrode extraction sections and between adjacent external electrodes being parameters.

The drop shock resistance tests were performed using a device shown in FIG. 6.

A substrate 51 having a capacitor array mounted thereon was secured to the drop jig 52 at a certain.distance therefrom by interposing nuts or the like. The drop jig 52 was formed of resin, was about 150 mm on four sides, and weighed approximately 400 g. The drop jig 52 was secured at a distance of about 1.5 mm from the concrete base 54 in a vertical direction by the direction supporting rods 53. When the drop jig 52 was disengaged, it fell onto the surface of the concrete base 54. The drop jig 52 was repeatedly dropped, and the capacitor arrays were observed to find out if they were cracked. The following results were obtained.

In the solderability tests, solder was made to flow onto all of the capacitor arrays of the above-described structures by a solder mounting process under the same conditions, and the capacitor arrays were observed to find out if there were any short circuit failures.

The results of the tests are shown in Table 1.

TABLE 1

| | FORM (REFERENCE FIGURE) | EXTERNAL ELECTRODE PITCH (Pi) | GAP $P_G$ BETWEEN EXTERNAL ELECTRODES | DROP TEST RESULT (n = 10) | SHORT CIRCUIT FAILURE RATIO |
|---|---|---|---|---|---|
| 1 | FIG. 3 | 600 $\mu$m | 200 $\mu$m | CRACKING AFTER DROPPING 30 TO 50 TIMES | 0 |
| 2 | FIG. 4 | 460 $\mu$m | 60 $\mu$m | NO CRACKING AFTER DROPPING 50 TIMES OR MORE | 0 |
| 3 | FIG. 5 | 460 $\mu$m | 60 $\mu$m | NO CRACKING AFTER DROPPING 50 TIMES OR MORE | 0 |
| 4 | FIG. 4 | 450 $\mu$m | 50 $\mu$m | NO CRACKING AFTER DROPPING 50 TIMES OR MORE | 100 ppm |
| 5 | FIG. 9 | 800 $\mu$m | 400 $\mu$m | CRACKING AFTER DROPPING LESS THAN 10 TIMES | 0 |
| 6 | FIG. 10 | 900 $\mu$m | 500 $\mu$m | CRACKING AFTER DROPPING LESS THAN 5 TIMES | 0 |

FIGS. 3, 4, and 5 represent the different forms of the capacitor arrays of the present invention.

FIGS. 9 and 10 represent the different forms of the capacitor arrays of the related examples.

As shown in Table 1, no cracking occurred in the different forms of the capacitor arrays of preferred embodiments of the present invention after dropping them at least 30 times or more in the drop shock resistance tests. On the other hand, cracking occurred in the related capacitor arrays after dropping them less than 10 times in the drop shock resistance tests. From these results, it can be understood that drop shock resistances are greatly improved by reducing the pitch between the internal electrode extraction sections and the pitch between the external electrodes as indicated in preferred embodiments of the present invention. Since the drop shock resistances of the capacitor arrays shown in FIGS. 4 and 5 were higher than the drop shock resistance of the capacitor array shown in FIG. 3, it can be understood that the smaller the pitch between the external electrodes, the higher the drop shock resistance. Therefore, the smaller the pitch between external electrodes, that is, the smaller the soldering pitch with respect to the substrate to which a capacitor array is mounted, the higher the drop shock resistance. This is believed to be because there is a decrease in the amount of stress, produced by flexing of the substrate to which a capacitor array is mounted, exerted upon a soldered portion of the capacitor array when the substrate is subjected to shock when it falls.

Here, when the gap between the external electrodes is too small, short circuit failure occurs due to soldering (4 in Table 1). Therefore, from the tests, it is desirable that the gap between the external electrodes be equal to or greater than about 50 μm.

The capacitor array shown in FIG. 5 (5 in Table 1) does not particularly have any problems with regard to its drop shock resistance and solderability. However, since the external electrodes are disposed towards one end of the dielectric sheet 12, the capacitor array has directionality. Therefore, it is necessary to pay attention to the direction in which the capacitor array is mounted to the substrate. In addition, in the case where the capacitor array is automatically mounted, when a component is taped (a preliminary step), packaging must be performed in accordance with the directionality of the capacitor array, so that it becomes more burdensome to perform the process for manufacturing a product. Therefore, in order to eliminate the directionality of the capacitor array, it is desirable to form the external electrodes symmetrically relative to the center of a side surface of the capacitor array.

According to a preferred embodiment of the present invention, it is possible to form a capacitor array having excellent drop shock resistance by causing the pitch between the external electrodes, formed at side surfaces of a substantially parallelepiped component, to be smaller than the pitch between the internal electrodes that are in electrical conduction with the external electrodes.

According to preferred embodiments of the present invention, it is possible to form a capacitor array having excellent drop shock resistance and improved solderability by making the gap between adjacent external electrodes equal to or greater than about 50 μm.

According to preferred embodiments of the present invention, it is possible to form a capacitor array which does not have directionality, which makes it possible to restrict improper mounting, and which is easily packaged by providing the external electrodes symmetrically to the center of a side surface of the component in the direction in which the internal electrodes are disposed in parallel.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A capacitor array comprising:

a component including a plurality of stacked dielectric sheets, each of said plurality of dielectric sheets having a plurality of internal electrodes and internal electrode extraction sections disposed on a surface thereof, the internal electrodes being disposed substantially parallel to each other, the internal electrode extraction sections being in electrical conduction with their respective internal electrodes and extending to a side edge of the dielectric sheet in a direction in which the internal electrodes are arranged substantially parallel to each other; and external electrodes, connected to the internal electrode extraction sections in a stacking direction one after another, provided at both side surfaces of the component;

wherein a pitch between the external electrodes provided at both side surfaces of the component, is smaller than a pitch between the internal electrodes which are in electrical conduction with the external electrodes.

2. A capacitor array according to claim 1, wherein a gap between the external electrodes that are adjacent to each other is equal to or greater than about 50 μm.

3. A capacitor array according to claim 1, wherein the external electrodes are arranged symmetrically relative to the approximate center of a side surface of the component in the direction in which the internal electrodes are arranged substantially parallel to each other.

4. A capacitor array according to claim 1, wherein the component has substantially rectangular parallelepiped configuration.

5. A capacitor array according to claim 1, wherein a pitch between the internal electrode extraction sections is smaller than a pitch between the internal electrodes.

6. A method of forming a capacitor array comprising the steps of:

stacking a plurality of dielectric sheets not having internal electrodes formed thereon;

stacking a plurality of dielectric sheets having internal electrodes formed thereon upon the stacked dielectric sheets not having internal electrodes formed thereon so that internal electrode extraction sections of stacked adjacent upper and lower dielectric sheets do not overlap;

stacking a plurality of dielectric sheets not having internal electrodes formed thereon upon the stacked dielectric sheets having internal electrodes formed thereon;

sintering the stack of dielectric sheets; and forming external electrodes on the sintered stack of dielectric sheets such that the external electrodes are in electrical conduction with the internal electrode extraction sections; wherein a pitch between the external electrodes formed on both side surfaces of the sintered stack of dielectric sheets, is smaller than a pitch between the internal electrodes which are in electrical conduction with the external electrodes.

7. The method according to claim 6, wherein a gap between the external electrodes that are adjacent to each other is equal to or greater than about 50 μm.

8. The method according to claim 6, wherein the external electrodes are arranged symmetrically relative to the approximate center of a side surface of the sintered stack of dielectric sheets in the direction in which the internal electrodes are arranged substantially parallel to each other.

9. The method according to claim 6, wherein the sintered stack of dielectric sheets has substantially rectangular parallelepiped configuration.

10. The method according to claim 6, wherein a pitch between the internal electrode extraction sections is smaller than a pitch between the internal electrodes.

* * * * *